(12) United States Patent
Jefferson et al.

(10) Patent No.: US 8,256,703 B1
(45) Date of Patent: Sep. 4, 2012

(54) AIRCRAFT GROUND MAINTENANCE TETHER ASSSEMBLY

(76) Inventors: Ernest T. Jefferson, Bath, NC (US); James H. Van Dis, Bath, NC (US)

( * ) Notice: Subject to any disclaimer, the term of this patent is extended or adjusted under 35 U.S.C. 154(b) by 278 days.

(21) Appl. No.: 12/819,326

(22) Filed: Jun. 21, 2010

(51) Int. Cl.
*B64D 47/00* (2006.01)
(52) U.S. Cl. .................. 244/1 R; 150/154; 73/273
(58) Field of Classification Search .................. 150/154, 150/156, 160; 244/1 R
See application file for complete search history.

(56) References Cited

U.S. PATENT DOCUMENTS

| | | | | |
|---|---|---|---|---|
| 2,532,316 | A * | 12/1950 | Larkin | 150/154 |
| 5,026,001 | A * | 6/1991 | Wright et al. | 244/1 R |
| 5,127,265 | A * | 7/1992 | Williamson et al. | 73/182 |
| RE35,831 | E * | 6/1998 | Wright et al. | 244/1 R |
| 6,412,343 | B1 * | 7/2002 | Jefferson | 73/182 |
| 6,901,793 | B1 * | 6/2005 | Jefferson | 73/182 |
| 2003/0131916 | A1 * | 7/2003 | Alexander | 150/154 |

* cited by examiner

*Primary Examiner* — Timothy D Collins
*Assistant Examiner* — Medhat Badawi
(74) *Attorney, Agent, or Firm* — Ishman Law Firm P.C.

(57) ABSTRACT

A highly visible tether assembly for use on parked aircraft that interconnects the pitot tube covers with the landing gear lock pin thereby assuring removal of both the covers and the lock pin as part of the aircraft preflight check list. The assembly is made of heat and environment resistant materials that avoid instrument and air craft damage during installation and residence.

6 Claims, 6 Drawing Sheets

AIRCRAFT GROUND MAINTENANCE TETHER ASSSEMBLY

FIELD OF THE INVENTION

The present invention relates to the ground maintenance of aircraft and, in particular, to a tether assembly for assuring removal of ground protective devices prior to flight.

BACKGROUND OF THE INVENTION

During extended ground maintenance times, various protective devices are commonly installed to prevent damage to instrumentation and/or structural damage to the aircraft. Representatives are pitot tube covers and landing gear locks pins.

Pitot tubes are used on aircraft for measuring speed and altitude. They are sensitive and delicate, and thus prone to damage during maintenance, and storage. To limit damage and contamination, the pitot tube covers are installed during any appreciable outdoor layover to prevent dust, particulates, water, and other foreign matter from entering the probe ports, all of which can contribute to erroneous outputs. Equally important to installation during layover is the need to remove the pitot tube covers prior to flight. Should they remain in place during flight, there are no effective procedures for removal and the instrument's assessment of speed and altitude are severely compromised. Accordingly and, as a matter of standard operating procedure, if not removed the plane must return to base for cover removal. Inasmuch as the plane may have departed with a full fuel load, landing under such high loading conditions can create substantial forces that can damage the airframe or otherwise affect structural integrity. It would therefor be desirable to provide an apparatus and procedure for assuring the removal of pitot covers prior to flight.

The landing gear lock pins are installed to disable the landing gear retracting system to prevent inadvertent actuation during maintenance and/or ground operations that could collapse the nose wheel and structurally damage the aircraft. As with the pitot tube covers, the pins must be removed prior to flight, and if not removed, the plane must return to base with the resultant unnecessary expense and potential structural damage from a full weight landing.

While there are established procedures for removing the covers and lock pins, human error nonetheless continues to produce non-compliant flights. Accordingly, it would be desirable to provide a maintenance product that would further reduce the chances of the covers and lock pins remaining on the aircraft at takeoff.

SUMMARY OF THE INVENTION

The present invention provides a highly visible tether assembly for use on parked aircraft that interconnects the pitot tube covers with the landing gear lock pin thereby assuring removal of both the covers and the lock pin as part of the aircraft preflight check list. The assembly is made of heat and environment resistant materials that avoid instrument and air craft damage during installation and residence.

More particularly, the tethering assembly comprises a plurality of pitot tube covers for preferably all of the aircraft's pitot tubes, on both sides of the aircraft that are interconnected by a lanyard of temperature resistant woven aramid material wherein the lanyard is provided with a middle biasing sleeve that elastically conforms to the fuselage contour in installation. The sleeve includes a connecting strap carrying a lock pin at an outer end that for disabling the landing gear retraction assembly to prevent inadvertent actuation on the ground.

In one aspect, the invention provides a ground maintenance assembly for an aircraft having at least a pitot tube on opposed sides of a fuselage above a front landing gear having a retracting linkage immobilized by insertion of a locking pin into a locking aperture thereon wherein the maintenance assembly includes a pitot tube cover for telescopic insertion over each pitot tube; an expandable tether assembly having opposed elongated straps, each having a distal end connected to one of said pitot tube covers, said tether assembly having a sleeve member with a passage therein, wherein one of said straps has a proximal end fixedly connected to said sleeve member and wherein the other strap has a proximal end connected to first end of an elastic member carried in said passage, said elastic member having a second end connected to said sleeve member whereby the length of the tether assembly is less that the distance about the fuselage between the pitot tubes and in assembly the elastic member is stretched to provide a biasing of the tether assembly against the fuselage; and a connecting strap having a first end attached to said tether assembly and a second end connected to said locking pin, said connecting strap having sufficient length in assembly to enable insertion of said locking pin in said locking aperture. In other aspects, the ground maintenance assembly may also use as the sleeve member is a planar rectangular sheet having opposed longitudinal edges releasably secured by fastening members to form a generally tubular shape with said passage extending therethrough. The ground maintenance assembly may have the straps and said sleeve member formed of a heat and environment resistant woven material, such as a meta-aramid polymer. The elastic member of the ground maintenance assembly may be an elastomer subject to ultraviolet degradation upon exposure to ambient sunlit conditions wherein the elastic member in said sleeve assembly is shielded from said condition in said passage. The ground maintenance assembly may include banners carrying notifications for removal before aircraft flight are attached at plural locations on said covers and/or tether assembly.

BRIEF DESCRIPTION OF THE DRAWINGS

The above and other features and advantages of the present invention will become apparent upon reading the following description taken in conjunction with the accompanying drawings in which.

DESCRIPTION OF THE PREFERRED EMBODIMENT

Figure 1:
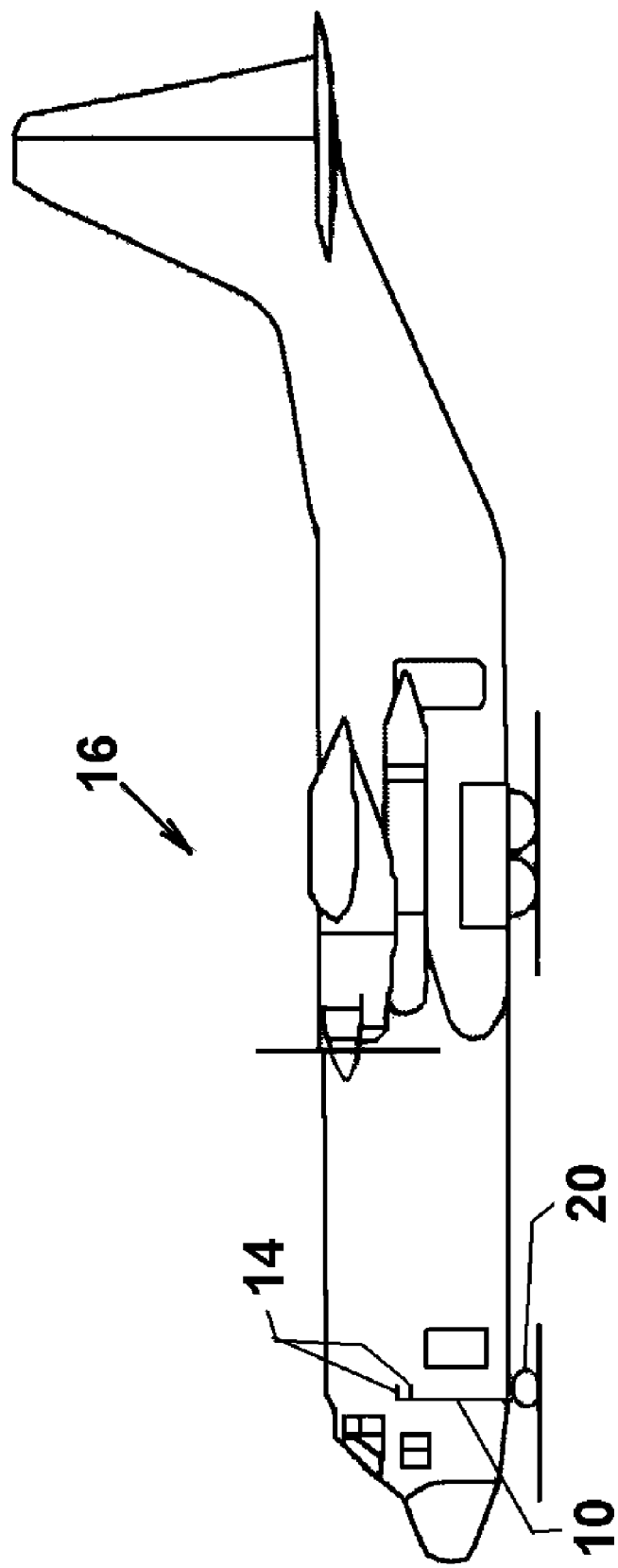
FIG. 1 is side view of an aircraft provided with an aircraft ground maintenance tether assembly in accordance with an embodiment of the invention.
Figure 2:
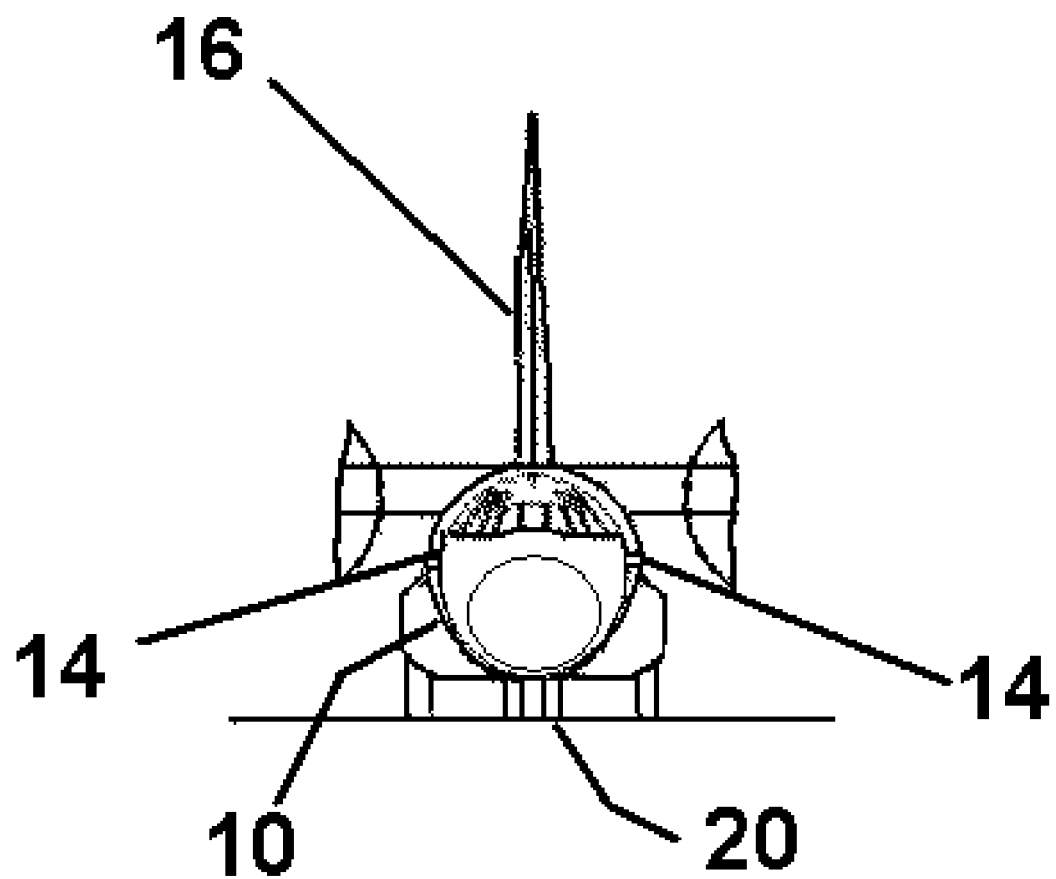
FIG. 2 is a front view of the aircraft of FIG. 1.

Referring to drawings, FIGS. 1 and 2 show an aircraft ground maintenance tether assembly 10 for assuring the installation and removal of covers for the pitot tubes 14 of an aircraft 16 during ground stays for maintenance, layovers and other normal extended aircraft ground based activities. The tether assembly 10 has particular benefit for the Hercules C130 aircraft. Therein, the aircraft 16 is provided with a pair of vertically spaced pitot tubes 14 on each side of the aircraft, generally vertically positioned above the front landing gear 20. As described below, the tether assembly 10 also includes a lock pin for conventional insertion into an aircraft dependent aperture in the front landing gear retraction assembly for disabling the retraction system therefor in order to avoid inadvertent collapse during ground operation. As part of the preflight check list, the pitot tube covers are removed and the lock pin is removed whereby retraction mechanism is again enabled.

Figure 3:
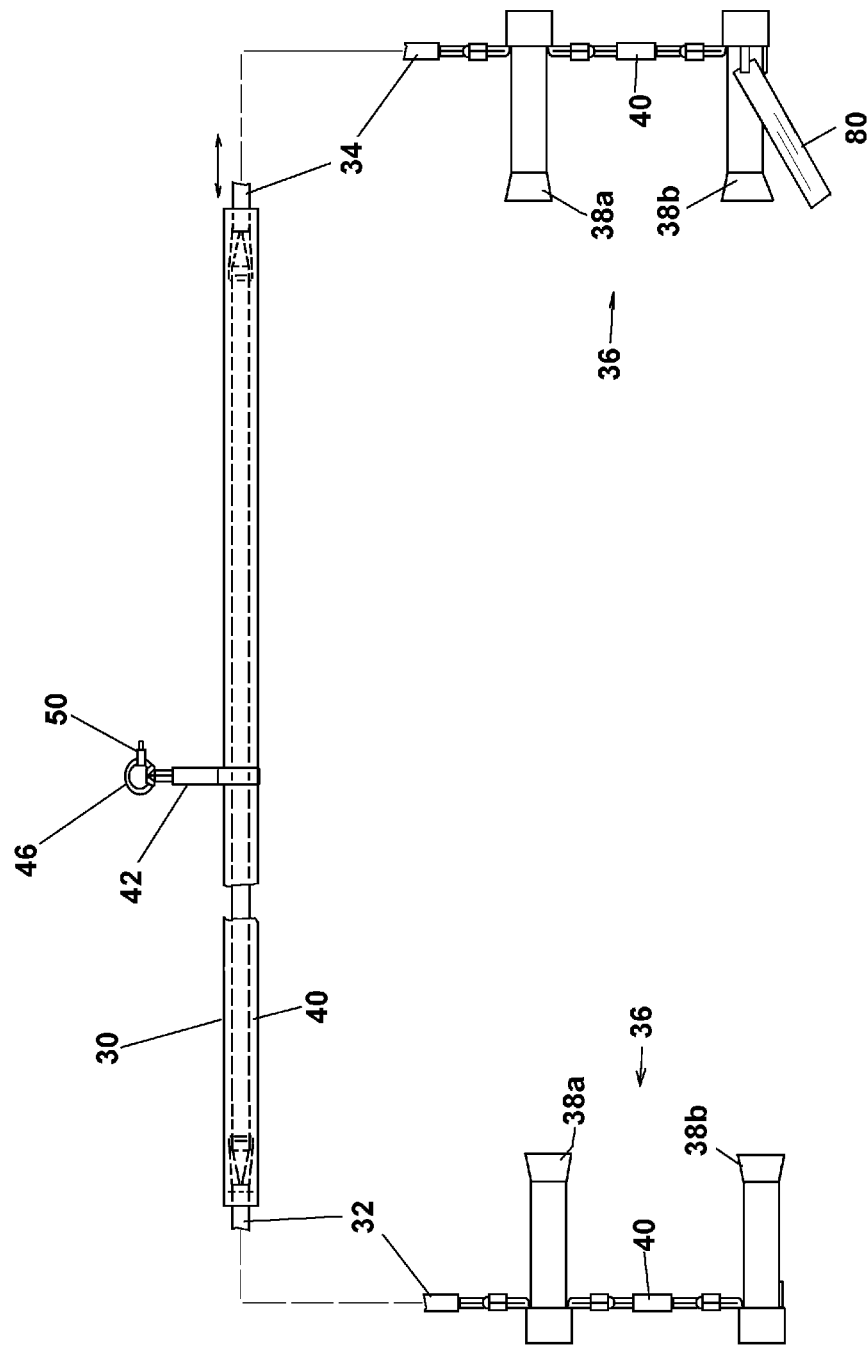
FIG. 3 is a top view of the tether assembly.
Figure 4:
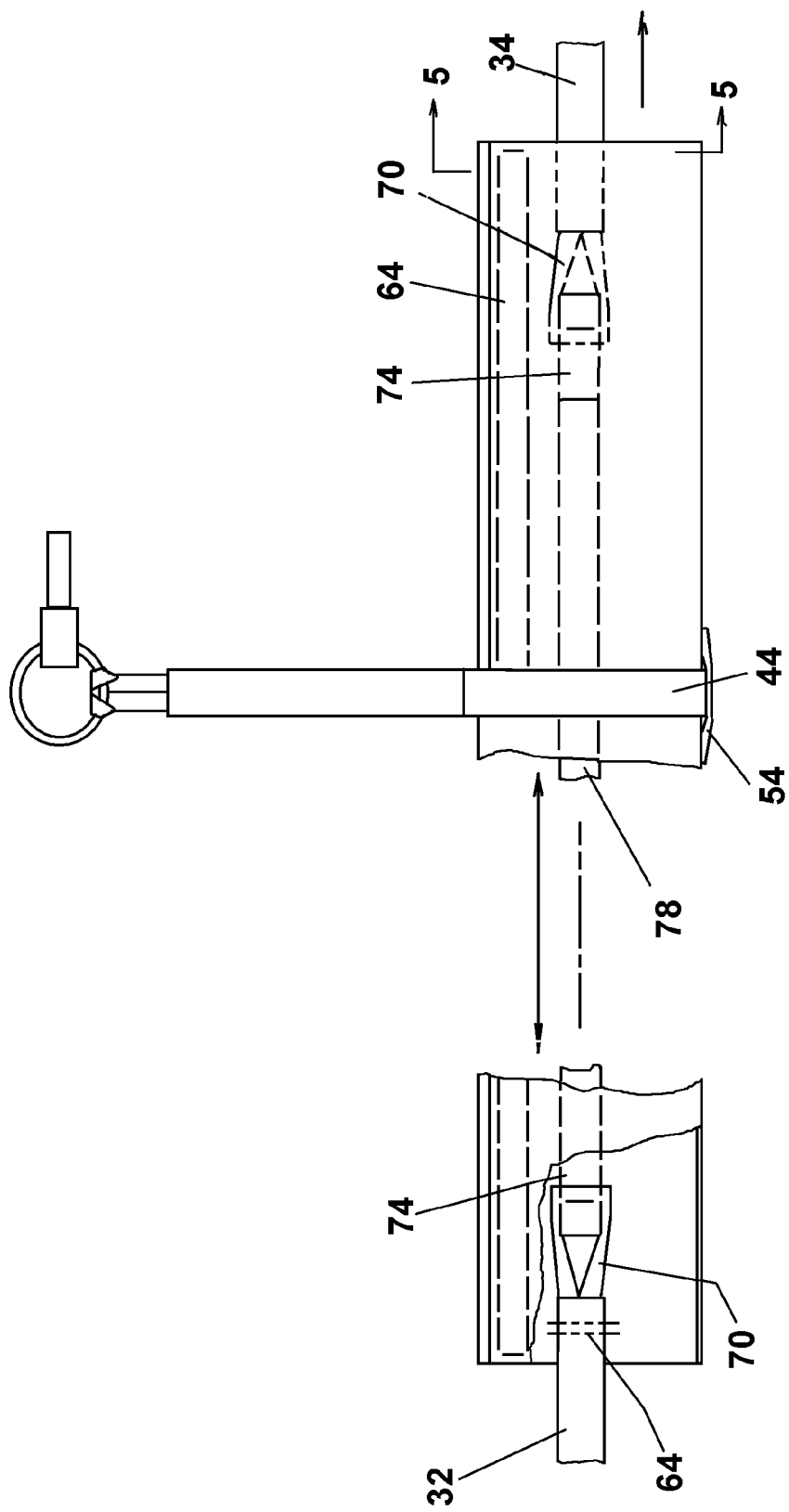
FIG. 4 is a top view of the sleeve assembly for the tether assembly.
Figure 5:
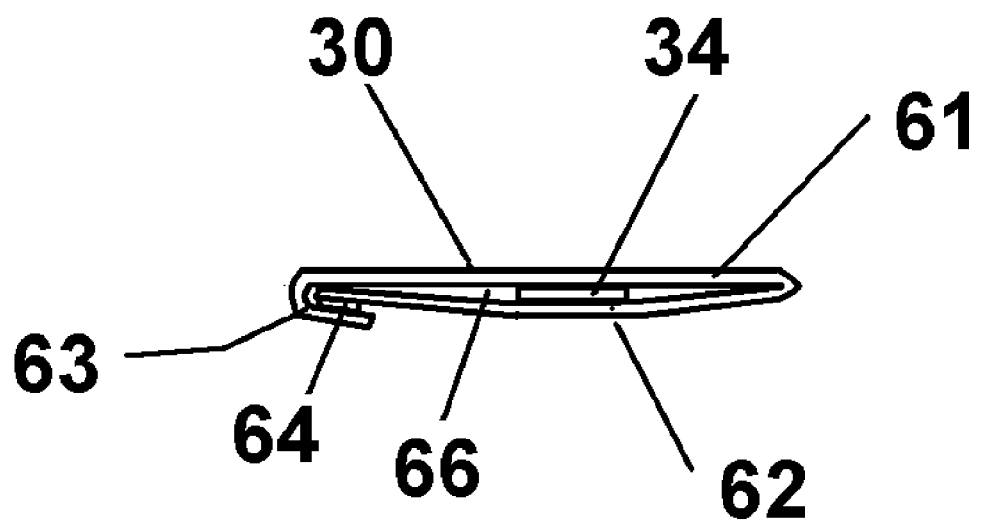
FIG. 5 is a view taken along line 5-5 of FIG. 4.

The tether assembly 10 of the present invention integrates a tethering system with both the pitot covers and the locking pin to assure removal of both items prior to flight. Referring to FIGS. 3 through 5, the tether assembly 10 includes an expandable sleeve assembly 30 having straps 32, 34 with proximal ends extending from opposite ends thereof and distal ends attached to a pitot tube cover assembly 36, each comprising a pair of pitot covers 38a and 38b interconnected by connecting strap 40. A lock pin strap 42 has an end loop 44 encircling the center section of the sleeve assembly 30 and terminates with a carrying ring 46 threaded through a cross hole in the head section 48 of a landing gear lock pin 50. The lock pin 50 includes a shank section 52 for coupling with the landing gear retraction system as described below to prevent inadvertent actuation of the retraction system during ground operations. A retaining strap 54 is connected to the cover assembly 32 and retains the strap 42 in assembly.

Referring to FIGS. 4 and 5, the sleeve assembly 30 comprises a rectangular body panel 60 having a base surface 61 connected to a reversely turned face surface 62. The base surface 61 has a reversely folder flap 63, The flap 53 and face surface 62 have a longitudinal fastening system 64, such a hook and loop strips, at the lateral sides thereof for forming a sleeve with a longitudinal passage 66 therethrough. Other systems such as zippers, button, snaps or the like can be used to for the sleeve and permit access to the interior for assembly and repair. The strap 32 is fixedly attached to the panel 62 by cross stitching 64. The strap 34 is attached to the panel 62 by an elastic cord assembly 66. The cord assembly 66 includes end loops 70 connected at outer ends to the straps 32, 34, respectively, and connected at inner ends to end loops 74 of an elastic cord 78. The entire cord assembly 66, particularly the elastic cord 78, is retained interior of the cover assembly 60 and thus shielded from environmentally degrading UV radiation. Normally, these cords are susceptible to environmental degradation during the long layover times the aircraft may experience, and consequently fail and require replacing. By retaining the cord entirely in the passage, the cord in isolated by sunlit conditions, extending the trouble free life thereof. The cord comprises an elastomeric core covered by an outer fabric sleeve. A bungee type cord is a preferred cord construction.

Accordingly, the length of the assembly may be elastically elongated in length in the direction of the arrows to provide tensioning of the tether assembly against the fuselage of the aircraft in assembly.

Each cover assembly 36 includes one or more pitot covers 38 connected to a distal end of the strap. For the present embodiment two covers are provided, a lower cover 38a and an upper cover 38b. Both covers are provided with diametrically opposed side loops 74. One loop of each lower cover 72 is connected to the distal ends of the straps 32, 34. An opposed loop of the lower cover is connected the connecting strap 40 connected to a comparable loop on the upper cover. Each cover may have an additional loop for mounting a highly visible removal banner 80 thereon carrying an appropriate indicia thereof such as "Remove Before Flight" reinforcing notice for removal prior to flight. Suitable covers are described in our prior patents, U.S. Pat. Nos. 6,412,343 and 6,901,793. Such covers are commercially available from Sesame Technologies Inc. of Belhaven, N.C., exclusive licensee of the above patents. Preferably, the covers are formed of heat and abrasion resistant woven materials such as meta-aramid polymers. Suitable materials are available a NOMEX™ or KEVLAR™ materials from E. I. DuPont deNemours and Company.

The length of the connecting strap 40 is preferably slightly longer than the distance between the pitot tubes to avoid imposing any adverse loading thereon. The overall length of the tether assembly with respect to the first or lower pitot tube covers is slightly less than the distance from the associated pitot tubes about the fuselage, so as to result in an elastic biasing from the cord to retain the tether assembly snugly against the aircraft, notwithstanding ambient wind conditions, without imparting significant loading on the pitot tubes. The connecting strap 42 and the lock pin 50 have a length allowing insertion of the lock pin without strap tensioning, but short enough so as not to become entangled with any neighboring components.

Figure 6:
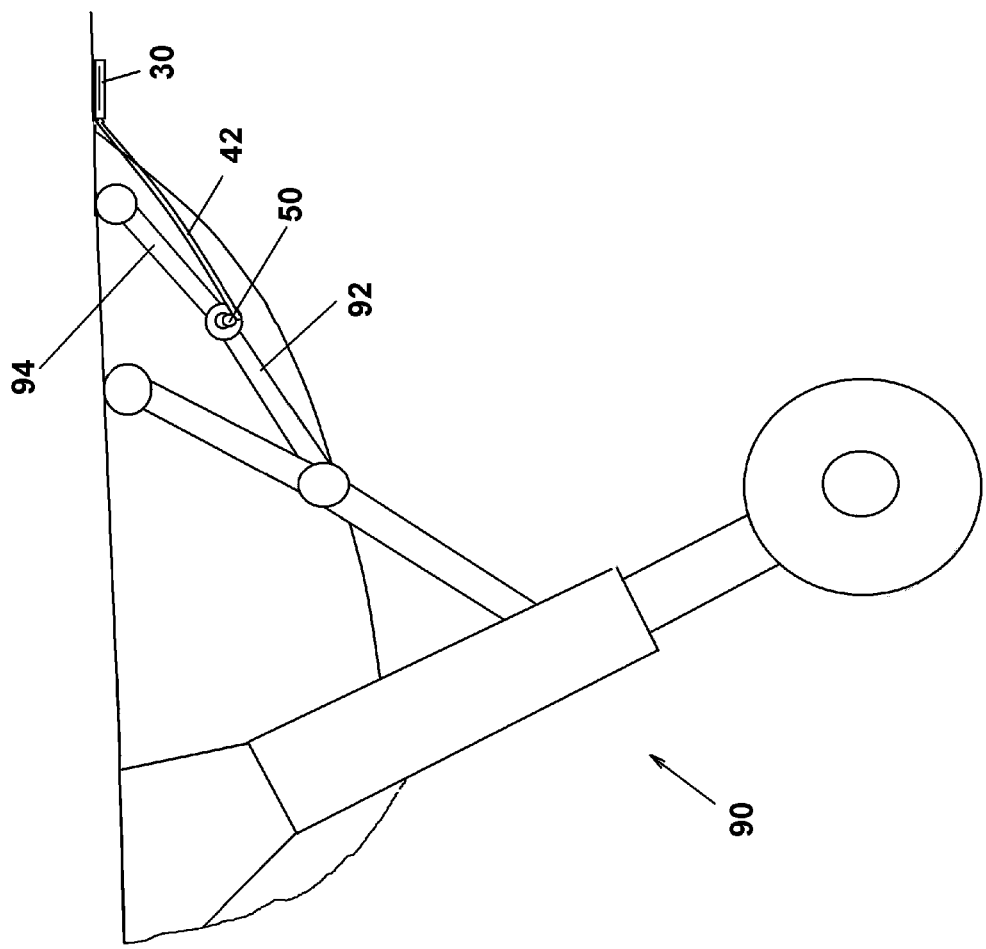
FIG. 6 is a schematic view of a landing gear assembly disabled by the lock pin of the tether assembly.

The landing gear disabling takes various forms dependent on the aircraft, mechanically preventing actuation of a retraction linkage or by disabling a retraction actuator. In these designs, a lock pin is inserted into the appropriate aperture. By way of example and not limitation, referring to FIG. 6, the front landing gear retraction assembly 90 is provided with aligned through holes in the gear struts 92, 94. The shank 52 of the lock pin 50 is inserted into the holes and prevents articulation of the struts thereby disabling the retraction system and maintaining the lowered position of the gear.

For installation, the covers are installed alternately at the sides of the aircraft thereby tensioning the cover assembly to provide the biasing of the tether assembly against the fuselage. Thereafter the lock pin in installed. Removal is by reverse sequence. By coupling the landing gear locking pin and covers in a single assembly with highly visible banners and covers. The identification of one component is an indication that preflight removal has not been completed. Thereafter, undertaking the removal of one component is physically coupled to adjacent components thus compelling the ground personnel to removal all items in order to stow the assembly prior to flight. Also, the woven fabric construction of the major components of the tether assembly lends to compact storage on the aircraft thus providing an assured deployable maintenance assembly at the next required layover.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claim.

What is claimed:

1. A ground maintenance assembly for an aircraft having at least a pitot tube on opposed sides of a fuselage above a front landing gear having a retracting linkage immobilized by insertion of a locking pin into a locking aperture thereon, said maintenance assembly comprising:

a pitot tube cover for telescopic insertion over each pitot tube;

an expandable tether assembly having opposed elongated straps, each having a distal end connected to one of said pitot tube covers, said tether assembly having a sleeve member with a passage therein, wherein one of said straps has a proximal end fixedly connected to said sleeve member and wherein the other strap has a proximal end connected to first end of an elastic member carried in said passage, said elastic member having a second end connected to said sleeve member whereby the length of the tether assembly is less than the distance about the fuselage between the pitot tubes and in assembly the elastic member is stretched to provide a biasing of the tether assembly against the fuselage; and a connecting strap having a first end attached to said tether assembly and a second end connected to said locking pin, said connecting strap having sufficient length in assembly to enable insertion of said locking pin in said locking aperture.

2. The ground maintenance assembly as recited in claim 1 said sleeve member is a planar rectangular sheet having opposed longitudinal edges releasably secured by fastening members to form a generally tubular shape with said passage extending therethrough.

3. The ground maintenance assembly as recited in claim 2 wherein said straps and said sleeve member are formed of a heat and environment resistant woven material.

4. The ground maintenance assembly as recited in claim 3 wherein said woven material is a meta-aramid polymer.

5. The ground maintenance assembly as recited in claim 4 wherein said elastic member is subject to ultraviolet degradation upon exposure to ambient sunlit conditions, said elastic member in said sleeve assembly being shielded from said conditions in said passage.

6. The ground maintenance assembly as recited in claim 5 wherein banners carrying notifications for removal before aircraft flight are attached at plural locations on said covers and/or tether assembly.

\* \* \* \* \*